H. L. CRANFORD.
COMPOSITION PAVEMENT.
No. 4,059. Reissued July 5, 1870.
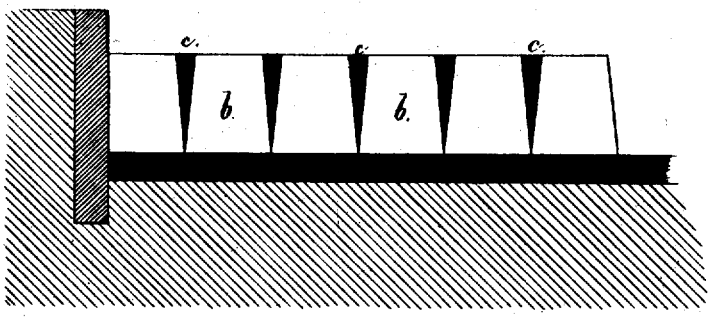
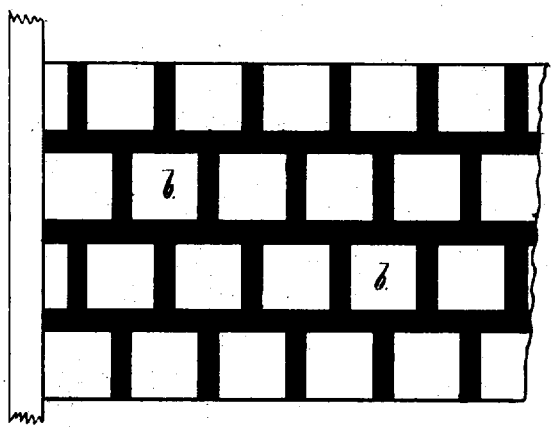
Witnesses,
Chas H Smith
Geo T Pinckney
Lemuel L. Cranford
Lemuel W. Serrell
Atty.
THE NORRIS PETERS CO. PHOTO-LITHO., WASHINGTON, D. C.

United States Patent Office.

HENRY L. CRANFORD, OF BROOKLYN, NEW YORK.

*Letters Patent No.* 93,280, *dated August* 3, 1869 ; *reissue No.* 4,059, *dated July* 5, 1870.

IMPROVEMENT IN COMPOSITION PAVEMENTS.

The Schedule referred to in these Letters Patent and making part of the same.

*To all whom it may concern:*

Be it known that I, HENRY L. CRANFORD, of Brooklyn, in the county of Kings and State of New York, have invented and made a certain new and useful Improvement in Composition Pavements; and the following is hereby declared to be a correct description thereof.

Pavements have heretofore been made in which a composition of sand or ashes and gravel or broken stone mixed with tar, or other bituminous materials, has been applied to the surface of cobble or other stone pavement, as may be seen in Letters Patent No. 88,139, granted March 23, 1869.

The present invention is an improvement upon the said invention, and relates to a mode of laying stone pavements.

Heretofore stone pavements have been laid either upon sand or gravel, or upon a concrete of hydraulic cement and broken stone.

In the first instance, the blocks of stone are liable to be disturbed from one of three causes, or from all combined.

First, water penetrates between the stones, causing the foundation to settle, in consequence of the percolation of the water.

Second, passing weights drive down some stones more than others, in consequence of inequalities of size in the supporting base or undersides of the stones, and greater density in the sand or earth at one place than another.

Third, frost disturbs the pavement, and renders the same irregular.

With hydraulic-cement concrete foundation there is no elasticity, the concussion of the horse's hoof is severe, and the animal and the vehicles are jarred, and rapidly injured.

In all the stone pavements heretofore laid, it has been necessary to dress off the stones more or less accurately, to aid in avoiding the difficulties before named, and to render the roadway sufficiently smooth.

My invention is intended to remove the difficulties before mentioned, and produce a pavement that is superior to those before constructed, and can be laid at a comparatively small cost.

I grade the roadway to the proper level, and camber, roll the samé, and spread thereon a composition of gravel or broken stone, or cinder and ashes, or sand, in about the proportion of two-thirds of the former and one third of the latter, rendered adhesive or plastic by sufficient tar or bituminous material. This makes an elastic concrete that is very durable, and impervious to water and frost.

In the drawing this is represented by the layer *a*.

Upon this layer *a* the stones *b b* are set. These stones may be split or hewn, or selected of the proper size and shape. They may be cubical, of the character known as the "Belgian blocks," but I prefer to have said blocks slightly pyramidal, as represented, with the stones nearer to each other transversely of the street than longitudinally, in order that wheels of vehicles may not pass in between the blocks of stone.

The stones, when slightly pyramidal, with the largest ends downward, may measure six inches at the base, and five inches by five and a half inches at the top, in order that the composition may be introduced into wedge-shaped openings; but the stones may be of any other desired measurements or shapes.

I fill in between the stones with the plastic composition aforesaid, as at *c*, and ram or roll the same, and the said composition is sufficiently thick upon the stone surface to render the pavement even, and of the desired smoothness.

By using blocks of the shape shown, there will be wedge-shaped masses of concrete at *c*, driven down between the stones, and the constant effect of travel over the pavement is to pack this wedge of concrete more firmly than before, and to make the pavement firm and reliable.

Pavement made in this manner, is—

First, partially elastic and very easy for both horses and vehicles.

Second, the water is excluded from the foundation, hence the frost will have no effect, and the pavement cannot sink.

Third, none of the materials employed can be injured by age or atmospheric influences.

Fourth, the stones are made to adhere to each other, and any weight is taken on a large extent of surface.

Fifth, as the surface of the pavement wears away, the asperities of the stone will be removed, as well as the plastic composition. For this reason the stones do not require to be dressed with great accuracy, or may be selected as aforesaid.

Sixth, the surface is such that horses cannot slip, because the material between the stones does not wear smooth, and is always sufficiently elastic to give a foothold.

Seventh, the durability of this pavement is very great, and the cost but little if any more than other stone pavements.

Eighth, this pavement is promotive of health, because of the disinfecting qualities of the tar used, and also because it is impervious to moisture and filth, the latter being easily swept away or washed off the surface, instead of soaking into the blocks, or between them, as is the case with the ordinary wood and stone pavements

I claim as my invention—

1. A pavement made of composition and stone, laid substantially as set forth.

2. The wedge-shaped filling of composition introduced between the stones, combined with the composition foundation below the stones, substantially as set forth.

Dated June 13, 1870.

HENRY L. CRANFORD.

Witnesses:

CHAS. H. SMITH,

GEO. T. PINCKNEY.